United States Patent
Horvitz

(10) Patent No.: US 7,696,866 B2
(45) Date of Patent: Apr. 13, 2010

(54) LEARNING AND REASONING ABOUT THE CONTEXT-SENSITIVE RELIABILITY OF SENSORS

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 312 days.

(21) Appl. No.: 11/770,649

(22) Filed: Jun. 28, 2007

(65) Prior Publication Data

US 2009/0002148 A1 Jan. 1, 2009

(51) Int. Cl.
*G08B 29/00* (2006.01)
(52) U.S. Cl. .................. 340/507; 340/506; 340/3.1; 340/825.36; 340/825.49
(58) Field of Classification Search ............ 340/506, 340/3.1, 825.36, 825.49
See application file for complete search history.

(56) References Cited

U.S. PATENT DOCUMENTS

| | | | |
|---|---|---|---|
| 5,400,246 A * | 3/1995 | Wilson et al. | 700/17 |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 5,835,886 A | 11/1998 | Scheil et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 6,847,892 B2 | 1/2005 | Zhou et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |

(Continued)

FOREIGN PATENT DOCUMENTS

JP 2005-250557 A 9/2005

(Continued)

OTHER PUBLICATIONS

Andy Harter, et al., A Distributed Location System for the Active Office, IEEE Network, 1994, pp. 62-70.

(Continued)

*Primary Examiner*—Daryl Pope
(74) *Attorney, Agent, or Firm*—Lee & Hayes, PLLC

(57) ABSTRACT

A sensor monitoring system is described that identifies inaccurate or degraded sensor data and corresponding sensors. The system analyzes a plurality of sensors to determine reliable sensors and isolate or reinterpret unreliable sensor data. An analysis component analyzes a traffic representation that varies as context varies and determines the probability that current sensor data is invalid. Learning and reasoning are performed from a case library of sensor failure data to build predictive models of sensor health that can provide inferences about the output of sensors. Resulting inferences about sensor reliability can be employed in base-level inferences and predictions about traffic flow.

20 Claims, 11 Drawing Sheets

U.S. PATENT DOCUMENTS

| | | |
|---|---|---|
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2003/0046401 A1 | 3/2003 | Abbott et al. |
| 2003/0154476 A1 | 8/2003 | Abbott, III et al. |
| 2005/0034078 A1 | 2/2005 | Abbott et al. |

FOREIGN PATENT DOCUMENTS

| | | |
|---|---|---|
| KR | 10-2003-0045420 A | 6/2003 |
| WO | 9800787 | 1/1998 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, in Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

International Search Report dated Dec. 12, 2008 for PCT Application Serial No. US2008/066394 , 3 Pages.

* cited by examiner

LEARNING AND REASONING ABOUT THE CONTEXT-SENSITIVE RELIABILITY OF SENSORS

BACKGROUND

Computer-driven systems utilize sets of sensors to monitor arterial flow systems. In general, arterial flow systems describe the movement of liquids, gases or granular materials through pipes, conveyors or other conduits. Movement of traffic through streets of a city or geographic region can also be viewed as an arterial system. The flow of automobiles and other vehicles through a city can be tracked using various types or sets of sensors. The collected sensor data can be utilized by a traffic flow system to monitor movement of traffic.

Traffic flow systems can be utilized for a variety of purposes including route planning and road design. For example, flow of traffic can be monitored to detect and predict bottleneck situations. Identification of bottlenecks in an arterial flow system, such as a traffic system, allows for diversion of materials and alleviation of the bottleneck. In addition, identification of road segments prone to bottlenecks can assist in planning future traffic flow or modifying existing roadways (e.g., expanding an existing two-lane road into a four-lane road).

Traffic flow can be monitored utilizing a variety of sensors. In particular, during rush hours, when most commuters are in transit between work and home, traffic in most major cities is monitored using helicopters, strategically positioned cameras and/or commuter reports of traffic incidents. In addition, particularly well-traveled roads can include networks of pressure sensors designed to monitor the flow of traffic. Commuters can be provided with traffic information necessary to plan a commute route via traffic reports broadcast over the radio or on their television. Traffic information can also be displayed via electronic signs alerting travelers approaching an interchange or other problem area. The signs can even include a prediction of travel time based upon the density and speed of traffic detected by the sensors. The provided traffic information allows drivers to plan their commute to avoid bottlenecks and minimize travel time.

The validity of the traffic flow information and systems that monitor or predict the traffic flow are dependent upon the validity of data received from sensors. In general, large sets of sensors are used to estimate or compute the current flow of the system and to predict the future flow. However, even in a system utilizing data collected by numerous sensors, invalid sensor information can lead to degraded performance of a traffic flow system.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Computer-driven route planning applications and other traffic flow systems are utilized every day to aid users in traffic planning, commute planning and the like. These flow systems are oftentimes dependent upon data received from a set of sensors. The systems can utilize information obtained using a variety of sensor methods including fixed or stationary sensors (e.g., pressure sensors and video cameras), sensors coupled to vehicles moving with the traffic flow (e.g., GPS) and traffic reports or any other indicators of traffic flow. The reliability and accuracy of such sensors can vary depending upon sensor type. Mechanical failure or other anomalies can lead to inaccurate sensor data. Route planning or other traffic flow systems utilizing invalid or inaccurate sensor data are unlikely to produce accurate results.

This specification, in one aspect thereof, discloses monitoring sensor data and identifying inaccurate sensor data to minimize or mitigate the impact of invalid or inaccurate sensor data. Suspect sensor data can be tagged and/or removed from the data set utilized by traffic flow systems. Additionally, an alert can be generated to notify a system operator of possible failure of a sensor or sensors associated with the identified, degraded sensor data.

The quality of a sensor can be identified and labeled based in part upon the signals from sensors over time, in conjunction with other sensors that are monitoring related components of a system over time. For example, indications of failure of a sensor can come from non-changing values of a sensor over periods of time where there is typical variation seen in a system, and such variation might be sensed by sensor data received from sensors proximate to the sensor being evaluated, by making assumptions of flow through closed pipes or containers. Sensor data previously obtained can be evaluated to determine if the current sensor data is atypical, unusual, invariant and therefore more likely to be based in one or more kinds of failures, including ongoing stable failures, intermittent stereotypical failures, and more complex failures that introduces errors in a stochastic manner.

Sensor quality can be evaluated and predicted based on contextual features such as traffic flow representations and current context (e.g., time of day, day of week, weather conditions, location, motion and the like) to determine the likelihood of degraded sensor data. The traffic flow representation can be used to determine expected sensor data and identify sensor data outside the bounds of expected data (e.g., based upon a dynamic and/or predetermined threshold). In addition, the traffic flow representation can dynamically change based upon context to increase accuracy. Probabilistic models can be constructed for automatically inferring the health of sensors from data sets collected over time about the behavior of sensors, including labels assigned to each sensor about that sensors likely health, based on heuristic or other data that indicates the accuracy of individual sensors.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
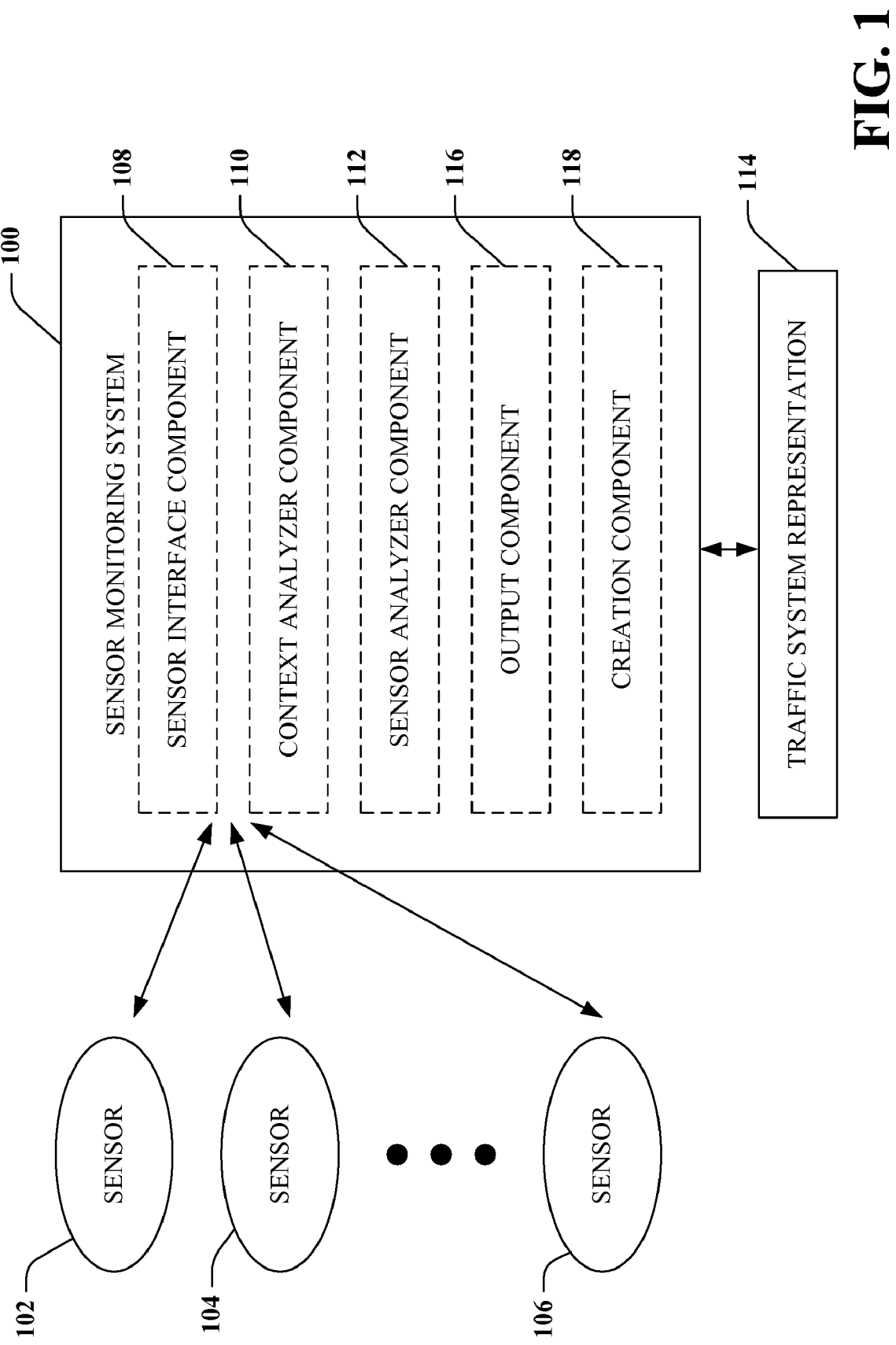
FIG. 1 is a block diagram of sensor monitoring system that evaluates sensor performance based at least in part upon contextual data in accordance with the subject matter described herein.

The subject invention is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Referring now to FIG. 1, a sensor monitoring system 100 is illustrated that detects degradation in sensor data and/or sensor performance for context-sensitive systems. The sensor monitoring system can be utilized in combination with a wide variety of arterial flow systems, such as traffic flow systems, to enhance the reliability of such systems. Traffic flow systems typically utilize data collected by a plurality of sensors. Analysis of sensor data can provide critical information to traffic systems. Consequently, the accuracy and reliability of sensor data is critical to such systems.

The sensor monitoring system 100 can request, receive and/or obtain sensor data from one or more sensors 102-106. The sensor interface component 108 can be communicatively coupled to a plurality of sensors 102-106 that are utilized to determine a state of a traffic system (or other suitable system where the concepts described herein can be employed). The sensors 102-106 can include pressure sensors embedded within road segments and utilized to determine rate of traffic flow and/or number of vehicles within a region. Sensors 102-106 can also include visual image sensors including, but not limited to, satellite images and video cameras (e.g., stationary cameras as well as cameras mounted on a helicopter, blimp, etc.). The sensors 102-106 can additionally be associated with web sites that describe traffic events and radio stations that monitor traffic within a region. Additionally, the sensors 102-106 can include sensors associated with individual vehicles, such as GPS receivers, speedometers, accelerometers, etc. A fleet of vehicles, such as buses, taxis and delivery vehicles can be used to monitor traffic flow.

Sensors can also be attached or included in portable devices, where a portable device can be any suitable device that can maintain a connection to a network, such as personal digital assistants (PDAs), smart phones, cellular phones, a laptop computer and the like. The portable device sensor can include a location sensor, speed sensors or other useful sensors. More specifically, sensors can include a GPS receiver, speedometer and an accelerometer. As portable device users travel, data from the sensors can be received by the sensor interface component 108. Foot traffic as well as vehicular traffic can be monitored using portable sensor devices.

The sensor interface component 108 can receive data from a predefined set of sensors. Alternatively, an ad hoc set of sensors can be used to collect sensor data provided to the sensor interface component 108. For example, the sensor interface component 108 can receive sensor data from a set of cell phone users who elect to provide their location information.

The sensor interface component 108 can be configured to receive sensor data continually. Alternatively, the sensor interface component 108 can obtain sensor data dynamically or on a periodic basis. The sensor interface component 108 can format data for use by traffic flow systems. The sensor interface component 108 can integrate sensor data received from a heterogeneous set of sensors (e.g., data received from GPS and video surveillance).

Sensor data and/or sensor performance can degrade due to a myriad of causes. Simple mechanical malfunction can cause a sensor to generate to invalid data. For instance, a mechanical flaw or even ordinary wear can cause a pressure sensor or video camera to fail. Frequently, sensors are exposed to large variations in temperature, moisture, excessive vibration and general wear and tear. Even if the sensor is performing properly, a vehicle to which the sensor is attached can suffer a mechanical malfunction, causing invalid sensor data. For example, a GPS sensor in a car that overheats and pulls off onto the shoulder of the road may appear to indicate that traffic has stopped on that road segment. Even if there are nearby sensors correctly recording traffic flow, data from the sensor of the stopped vehicle may impact traffic flow system performance.

Degradation in performance varies from intermittent and/or minor inaccuracies to complete failure, where a sensor generates inaccurate data. Typically, total failure can be easily identified. For instance, a sensor that fails to register any traffic during Monday morning rush hour may be identified without difficulty. However, intermittent or minor errors can be difficult to detect, yet can have a cumulative impact upon a traffic flow system dependent upon sensor data.

The sensor monitoring system 100 can further include a context analyzer component 110 that analyzes context associated with sensor data. For instance, the context analyzer component 110 can analyze the time of day at which the data was recorded. Additionally, the context analyzer component 110 can determine or receive information regarding the day of the week, whether a day is a holiday, current or forecasted weather conditions, current status of roadways (e.g., whether and where an accident has been reported) and any other suitable contextual data. The sensor monitoring system 100 can evaluate sensor performance based at least in part upon contextual data.

The sensor monitoring system 100 can include a sensor analyzer component 112 that analyzes the data received from the sensors 102-106 and identifies sensors with degraded performance or failure. The sensor analyzer component 112 analysis can be based upon prior data received from a sensor, data recorded by sensors proximate to the sensor being evaluated, and/or contextual information. Context or conditions under which data is collected can be used to determine if a sensor reading is reasonable or unlikely given other sensors and contextual information. For instance, sensor data indicating a large volume of traffic may be well within the expected range of values during rush hour on a particular road segment, but may be suspect if recorded at three o'clock Sunday morning. The sensor analyzer component 112 can consider various contextual events during sensor analysis, including occurrence of major events (e.g., sporting events, cultural events), weather, accidents, traffic reports in natural language, lane or road closures, historical information, etc.

The sensor analysis component 112 can access a traffic system representation 114 that describes probable traffic flow and alters as context changes. In a particular example, the traffic system representation 114 can be and/or include a weighted graph, where nodes of the graph represent intersections, edges represent road segments between the intersections, and weights associated therewith represent average travel speeds or traffic volume for the road segments/intersections. The weights can alter as context alters. For instance, a first weight can be provided for a road segment at a first time of day and a second weight can be provided to the same road segment at a second time of day. Thus, the traffic system representation 114 can represent how traffic flows alter given different times of day (e.g., rush hour versus non-rush hour), days of week (e.g., weekday versus weekend), weather conditions (e.g., raining versus sunny), and other suitable contextual data.

Such information can be used directly in models that provide current flows as well as predictions of future flows of traffic. More generally a database of likely sensor failures can be created and joined with contextual information and this database can be used in the construction via machine learning methods of models that predict for each sensor, based on such observations as proximal sensor values over time, the health each sensor.

With more detail with respect to the traffic system representation 114, flows (e.g., a manner in which traffic is moving or expecting to move) at road segments can be represented by probability distributions over flows and these probability distributions can be a function of contextual observations such as time of day, day of week, calendar information, flows seen at earlier times, and/or flows in other parts of the traffic system. Probabilistic forecasting models can be trained, wherein the models employ one of multiple forecasting methods that take current flows across a traffic system and compute forecasts about future flows on the traffic system, where predictions for future flows can be targeted for different contexts. Sensor data can be evaluated with respect to predictions for a context comparable with the current sensor context. While variations are to be expected even with identical contexts, probability of error can be generated as a function of variation from the expected traffic flow.

The sensor analyzer component 112 can utilize probabilistic models. One of several discriminative or generative statistical methods can be employed for prediction and forecasting over time. These methods include statistical classifiers such as support vector machines, the use of Bayesian structure search within the realm of Bayesian machine learning, the learning and usage of dynamic Bayesian networks and related Hidden Markov Models, Continuous Time Bayesian Networks (CTBNs), and families of time-series methods such as those employing temporal Bayesian models, and models known as ARMA and ARIMA forecasting models.

The sensor monitoring system 100 can provide sensor data to one or more traffic flow systems (not shown), such as a route planning system. Sensor data can be provided to a traffic flow system by a data output component 116 of the sensor monitoring system 100. The data output component can provide all sensor data received from the sensors 102-106, including data identified as degraded. Suspect or questionable data can be marked or tagged, allowing the route planning system to ignore and/or minimize use of possibly degraded data. Alternatively, sensor data can be filtered by the data output component 116, such that the traffic flow system does not receive data identified as degraded. Furthermore, the data output component 116 can filter certain sensor data and mark other sensor data as suspect. The data output component 116 can remove data that has a high probability of being degraded, while providing data identified as suspect, but less likely to be invalid.

A creation component 118 employs machine learning to build at least one model used to predict and/or interpret output of sensors, including error models and/or failure models. The creation via machine learning of models can be used to predict or interpret the output of sensors, including their error models or failure modalities. The creation of such models with machine learning relies on the storage of a library of likely sensor failure data along with relevant contextual data to create predictive models that can be applied to any sensors. Such case libraries capture the history of potentially anomalous outputs of the sensor, and couple this data about potential failures with other observations such as time of day, day of week, statistics of traffic flow registered about parts of a traffic system, type and brand of sensor, proximate sensors in series with the current sensor, etc. Constructed models can be applied in real-time to interpret the reliability of sensors, including deterministic and stochastic functions of outputs that can be applied to use the erroneous data (e.g., this sensor can provide valuable information but it has to be resealed, etc.). The creation component 118 can build probabilistic models to predict sensor failures based on evidence and a library of likely failures.

The creation component 118 can include machine learning and reasoning one or more methodologies for learning from data and then predicting and/or interpreting sensor output from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

Methods also include methods for the capture of logical relationships such as theorem provers or more heuristic rule-based expert systems. Inferences derived from such learned or manually constructed models can be employed in optimization techniques, such as linear and non-linear programming, that seek to maximize some objective function.

Figure 2:
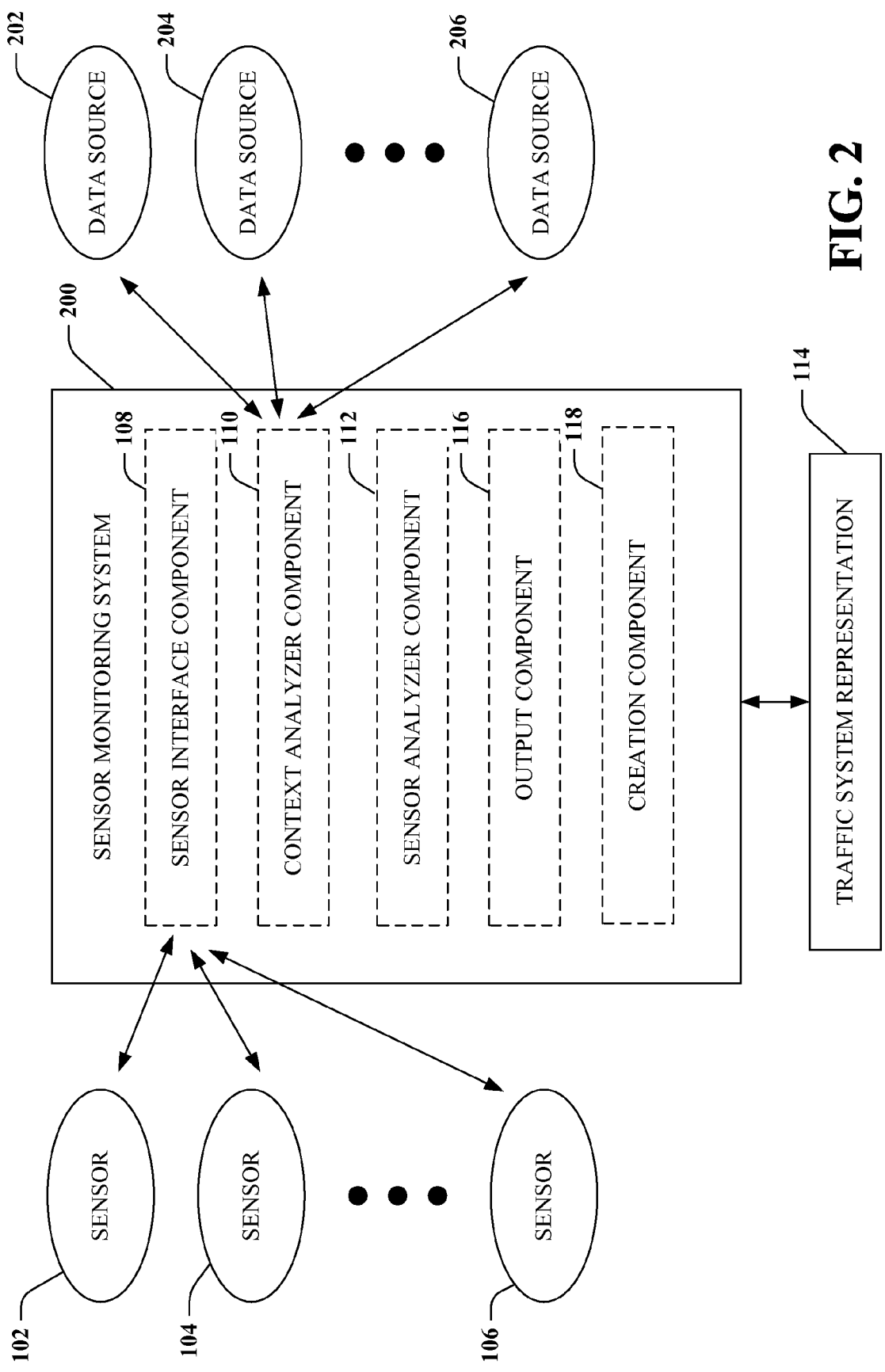
FIG. 2 is a block diagram of a sensor monitoring system in accordance with the subject matter described herein.

Turning now to FIG. 2, a sensor monitoring system 200 is illustrated. The sensor monitoring system 200 can receive, request and/or obtain context data from a plurality of data sources 202-206. The data sources 202-206 can be any suitable data sources. For instance, the data source 202 can be a website that describes current/forecast weather conditions. In another example, the data source 202 may be a radio station that announces traffic accidents, wherein the context analyzer component 110 can understand and interpret particular words relating to such accidents.

Figure 3:
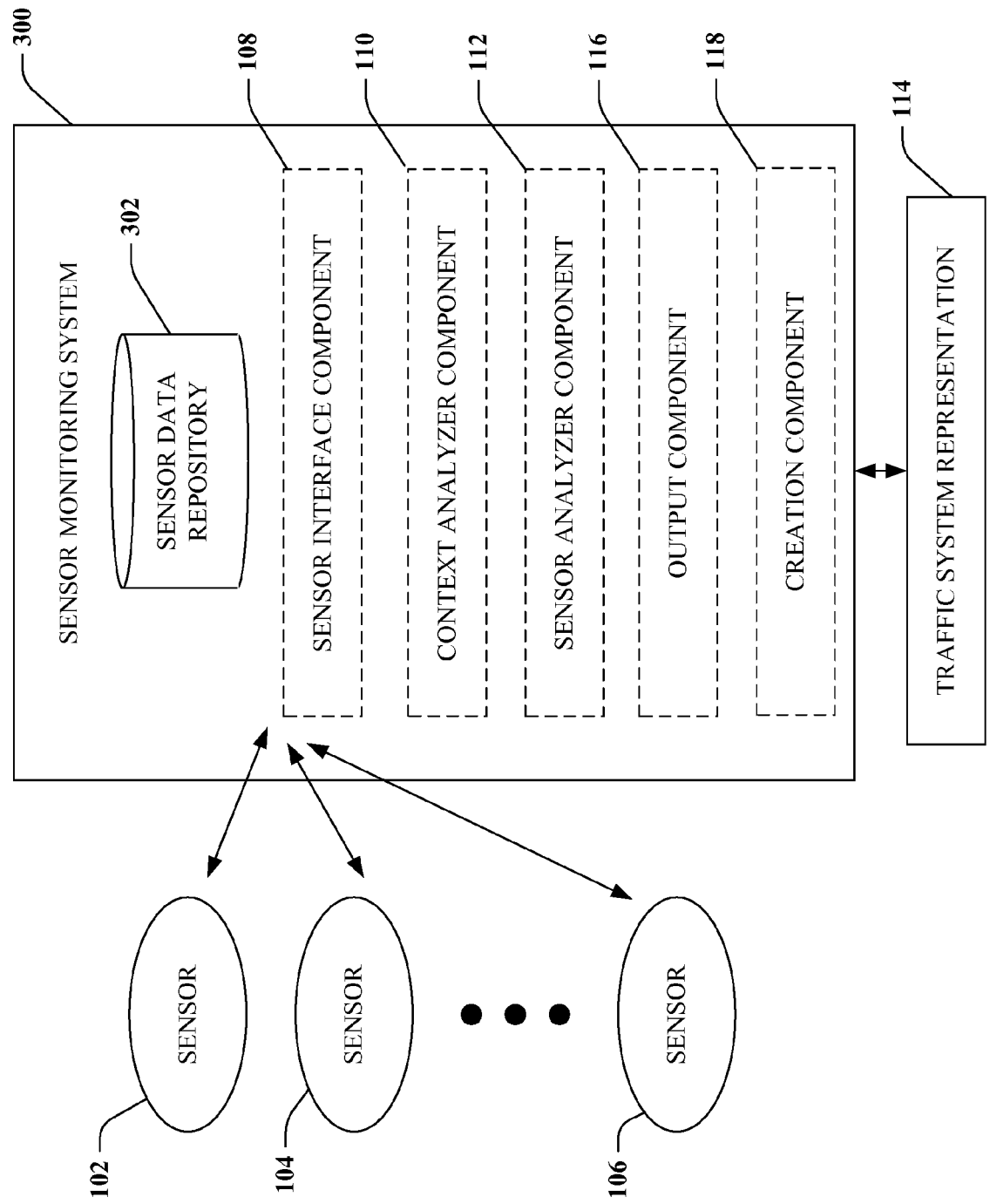
FIG. 3 is a block diagram of a sensor monitoring system in accordance with the subject matter described herein.

Referring now to FIG. 3, a sensor monitoring system 300 is illustrated. The system 300 additionally includes a sensor data repository 302 that maintains sensor data previously received from the sensors 102-106. In analyzing sensor data to identify suspect sensor data, the sensor analyzer component 112 can utilize previously recorded sensor data. This can include prior data received from a particular sensor being evaluated. The sensor data repository 302 can also maintain a record of prior degraded sensor data. A sensor that has previously provided degraded data can be considered less reliable than sensors that have not provided degraded data.

Figure 4:
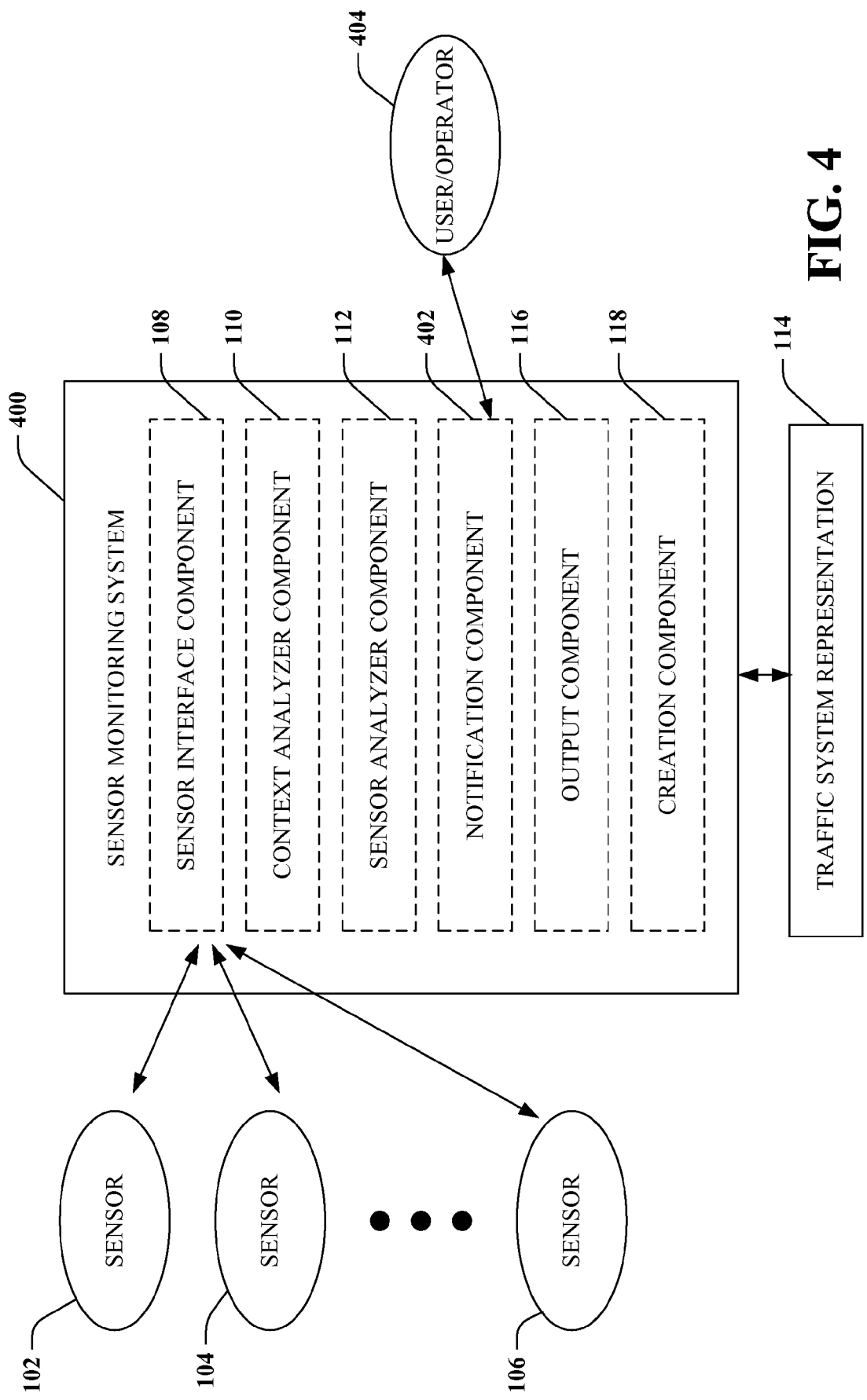
FIG. 4 is a block diagram of a sensor monitoring system provides notifications of sensor degradation in accordance with the subject matter described herein.

Referring now to FIG. 4, a sensor monitoring system 400 that notifies one or more users and/or operators of possible sensor failure is illustrated. If a determination is made that a sensor is providing invalid or inaccurate sensor data, an alert or notification can be provided. Information regarding sensor failure can be particularly useful for a system where sensors are controlled or governed by centralized system operators. Information regarding inaccurate sensor data can be invaluable in deciding whether sensors are too replaced or repaired.

Users or system operators can be notified of sensor data degradation in any reasonable manner. A notification can be sent as a short message service (SMS) text message delivered to a cell phone, a voicemail, an email or any other delivery system. The system 400 can include a graphic user interface (GUI) (not shown), in which case notification of sensor failure can appear as a flag or visual cue indicating possible errors. The notification can include information such as the length of time the sensor is likely to have been inaccurate, the probability that sensor performance has degraded below permissible levels and any other information useful to the operator.

Figure 5:
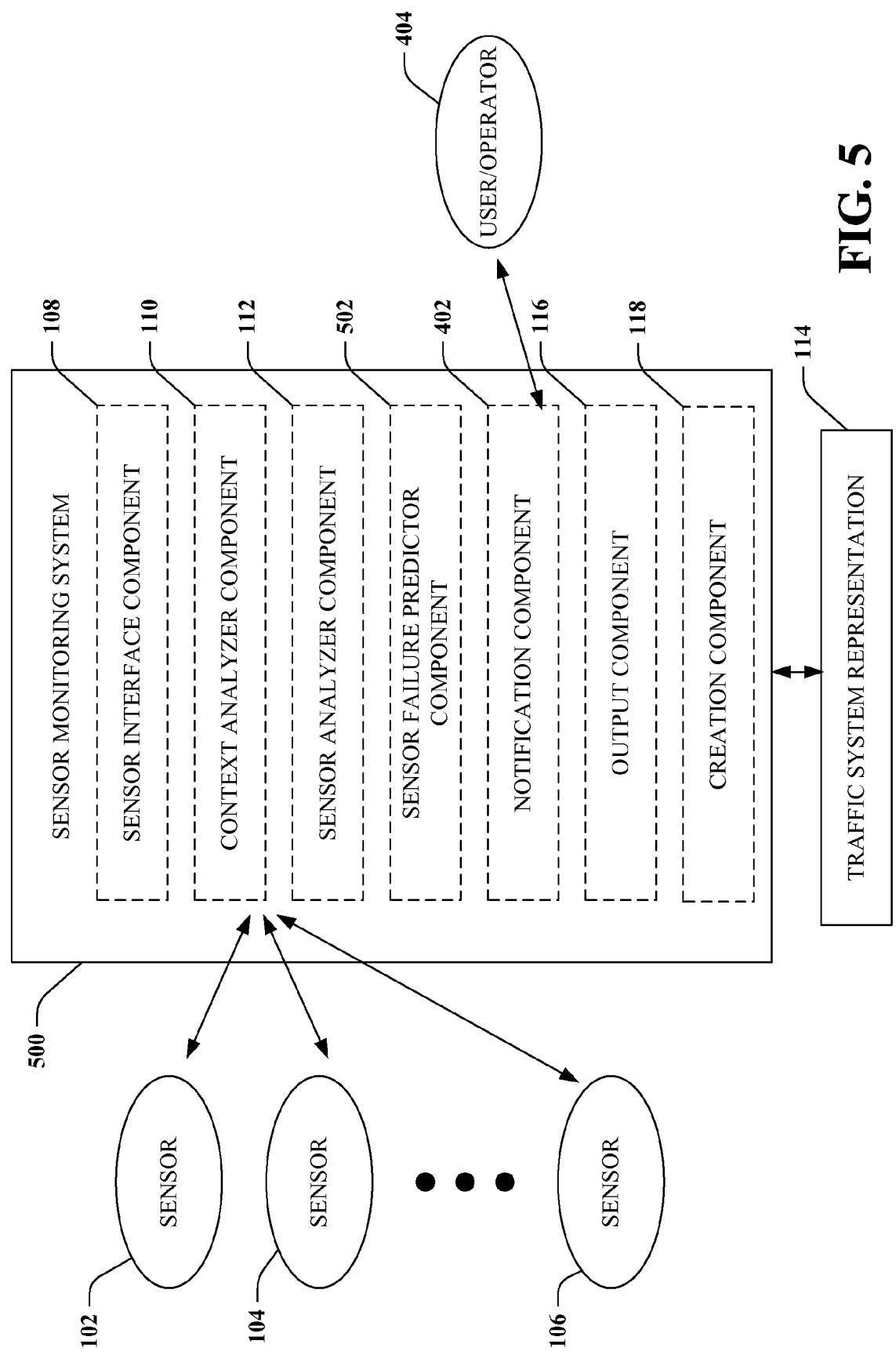
FIG. 5 is a block diagram of a sensor monitoring system that predicts sensor failure in accordance with the subject matter described herein.

Referring now to FIG. 5, a sensor monitoring system 500 that predicts sensor failure is illustrated. The sensor monitoring system 500 can further include a sensor failure predictor component 502 that can predict degradation of performance or failure of a sensor. The sensor failure predictor component 502 can analyze sensor performance over a period of time to evaluate the likelihood that a sensor will fail or exceed acceptable tolerances in the future. Predictions of sensor failure can be based upon sensor performance, sensor age and/or sensor context (e.g., extreme weather conditions, excessive use and the like). Machine learning system can be utilized to predict likely failures as well as their effect or impact upon overall system reliability.

One of several discriminative or generative statistical methods can be employed to predict sensor failure over time. These methods include statistical classifiers such as support vector machines, Bayesian machine learning, learning and usage of dynamic Bayesian networks and related Hidden Markov Models, Continuous Time Bayesian Networks (CT-BNs), and families of time series methods such as those employing temporal Bayesian models and models known and ARMA and ARIMA forecasting models.

The notification component 402 can notify system users or operators 404 of predicted sensor failures. Operators 404 can be provided with a predicted time of sensor failure and/or a probability of sensor failure within a specific period. Based upon all available sensors, the sensor failure predictor component 502 can produce a list of sensors most likely to fail. The list can be prioritized based upon cost of repair and/or replacement, number of other sensors in proximity, predicted failure of other nearby sensors or any other reasonable basis. For example, if it is determined that multiple, proximate sensors are predicted to fail at approximately the same time, those sensor may have priority on the list, to avoid the loss of all or most sensor data for a region.

Figure 6:
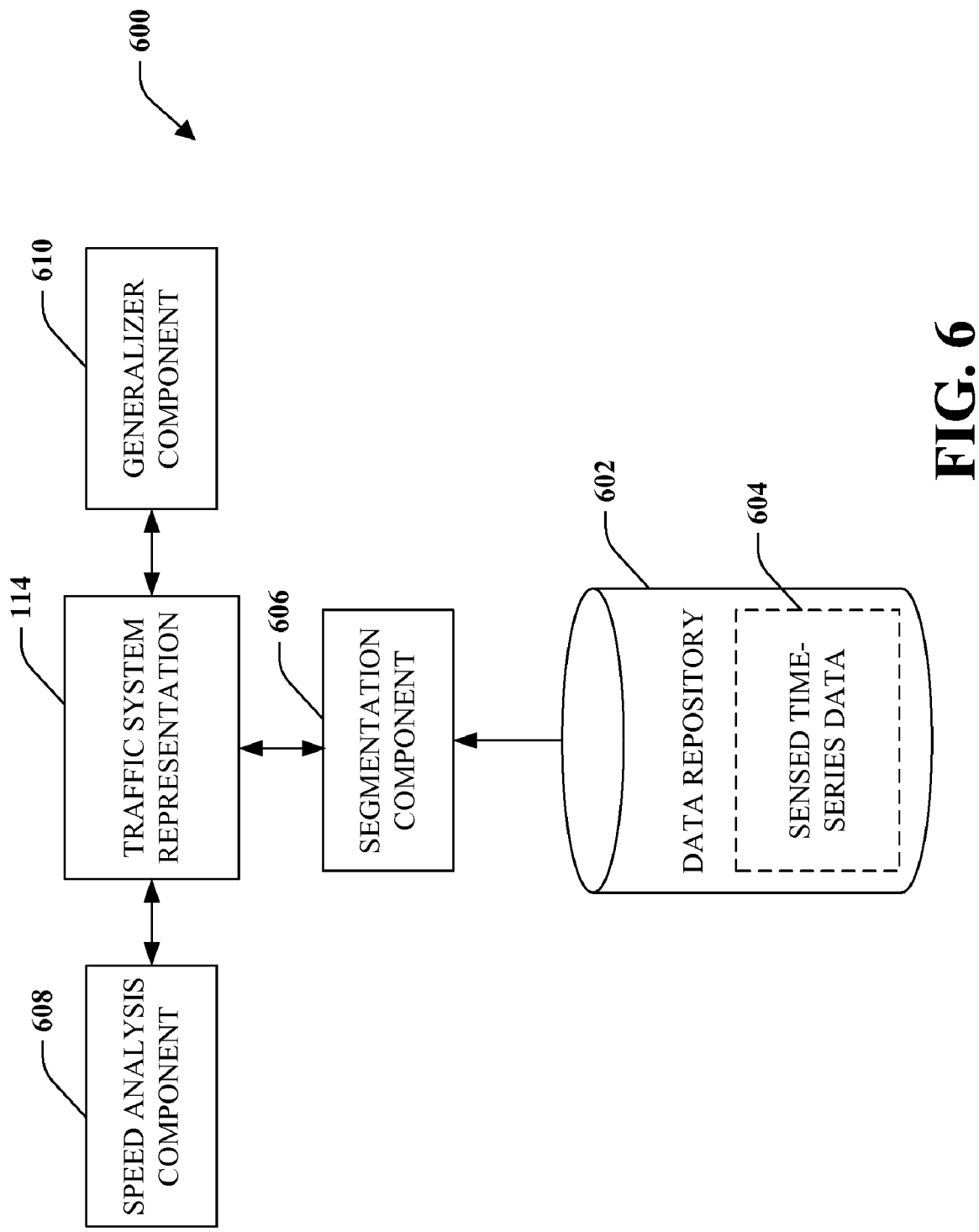
FIG. 6 is a block diagram of a system for building/refining a traffic system representation whose contents alter as context changes.

Referring now to FIG. 6, a system 600 for building a robust traffic system representation is illustrated. The system 600 includes a data repository 602 that includes sensed time-series data 604, wherein such data can be collected from a plurality of sensors (e.g., drivers as they travel through a traffic system). For example, the sensed time-series data 604 can be obtained by associating location/velocity-determining sensors (such as GPS receivers) with a plurality of drivers in a traffic system (e.g., a metropolitan traffic system). As data is generated from the sensors, such data can be associated with time-stamps. Thus, trace logs for each respective driver associated with the location-determining sensor(s) are generated and can be placed within the sensed time-series data 604. A segmentation component 606 can be employed to discern when individual journeys stop and start. As sensors associated with automobiles stop recording when the automobiles stop moving for a threshold amount of time, most (but not all) individual journeys taken by the drivers can be identified by the segmentation component 606 through reviewing time gaps that appear in the sensor logs.

The traffic system representation 114 can be built/defined based at least in part upon the sensed time-series data 604, and can be or include a graph, where nodes in the graph represent intersection of roads and edges represent road segments. A single road may be represented by multiple edges, as each road segment (the smallest unbroken portion of a road between two intersections) can be a separate edge in the graph. Additionally, the edges and nodes can be associated with latitudes and longitudes of roads that they represent. Once the sensed time-series data 604 segments into individual journeys, such journeys can be "snapped" to the traffic system representation 114 through any suitable manner.

Once the trace logs are mapped into road segments, a speed analysis component 608 can associate different weights to edges/nodes within the graph of the traffic system representation 114 over different times. For example, the speed analysis component 608 can learn time-dependent traffic speed for roads by breaking days of the week into multiple categories and breaking such categories into several time slices. For purposes of illustration, it can be assumed that the speed analysis component 608 breaks the days of the week into two categories: weekdays and weekends. Such categories can then be broken into 96 time slices: 15-minute blocks of time covering 24 hours of the day. It is understood, however, that the speed analysis component 608 can create categories associated with any sort of contextual data. For instance, the speed analysis component 608 can create categories based upon weather conditions, holidays, and the like.

Continuing with the above example, the speed analysis component 608 can learn a separate average speed for each time-of-day and weekday/weekend breakdown by examining each pair (A, B) of consecutive GPS points in snapped traces. The average speed of a driver between each pair can be calculated, and the speed can be utilized to create a running average for every road segment traversed to get from A to B. Speed measurements can be applied to the running average associated with a block of time whose time characteristics match those of timestamps of collected data involved in the speed calculation. Thus, the speed analysis component 608 can determine speeds associated with road segments in various categories (time of day, day of week, . . . ) The speed analysis component 608 can then associate such data with the traffic system representation 114, such that edges and nodes are weighted based upon the collected data.

It can be discerned, however, that it may be impossible to obtain data for every road in a traffic system over every category. Thus, road speeds can be generalized given known road speeds of "similar" road segments. In more detail, a generalizer component 610 can analyze the traffic system representation 114 and provide speed values to road segments that are not associated with collected data for each category. For instance, for road segments and time segments where no data is available, the generalizer component 610 can assign the speed that is associated with the same road segment at an adjacent time block. If there is no speed associated with an adjacent time block, the generalizer component 610 can assign the segment a speed from a similar road and/or a system-wide average of speeds from similar roads, where similarity can be defined by road class within the traffic system representation 114. Additionally, similarity can be determined by analyzing speed limits, geographic proximity of road segments, geographic location of road segments, and the like. Still further, if similar roads cannot be located and/or if a system-wide speed average is unavailable, the speed for a time segment can be defined as the posted speed limit. Moreover, the generalizer component 610 can utilize machine-learning techniques/systems to learn patterns/correlations within the traffic system representation 114 and assign average road speeds to road segments based at least in part upon learned patterns, correlations, and/or trends.

A representation of traffic flow and/or road speeds over road segments can be used to estimate likely sensor data for sensors associated with the road segments. Actual sensor data collected by such sensor can be evaluated with respect to the estimated or predicted sensor data. Sensor data that varies dramatically from predicted values can be considered suspect.

Figure 7:
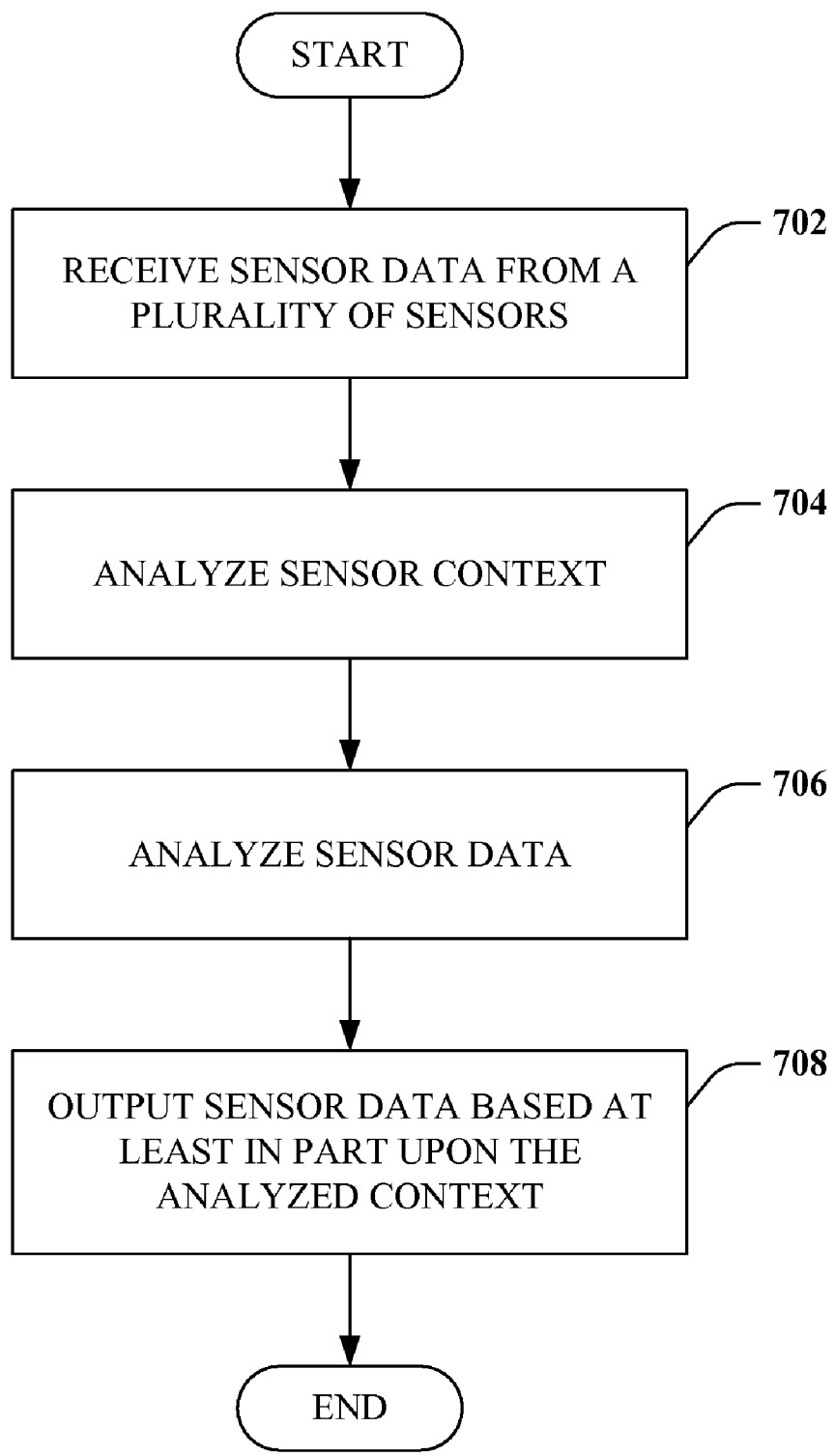
FIG. 7 is a representative flow diagram of a methodology for identifying sensor data degradation in accordance with the subject matter described herein.
Figure 8:
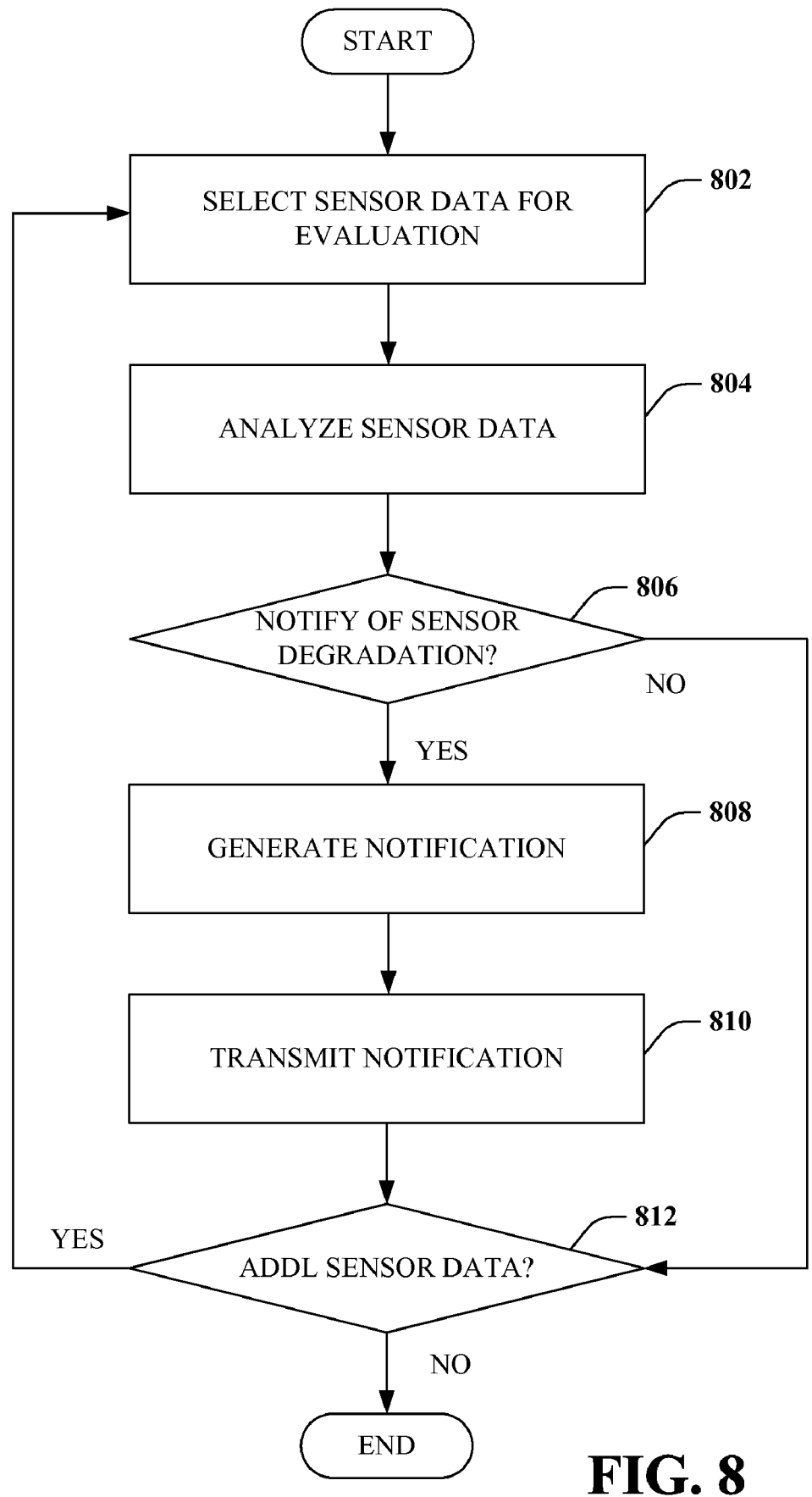
FIG. 8 is a representative flow diagram of a methodology for providing notification of sensor data degradation in accordance with the subject matter described herein.
Figure 9:
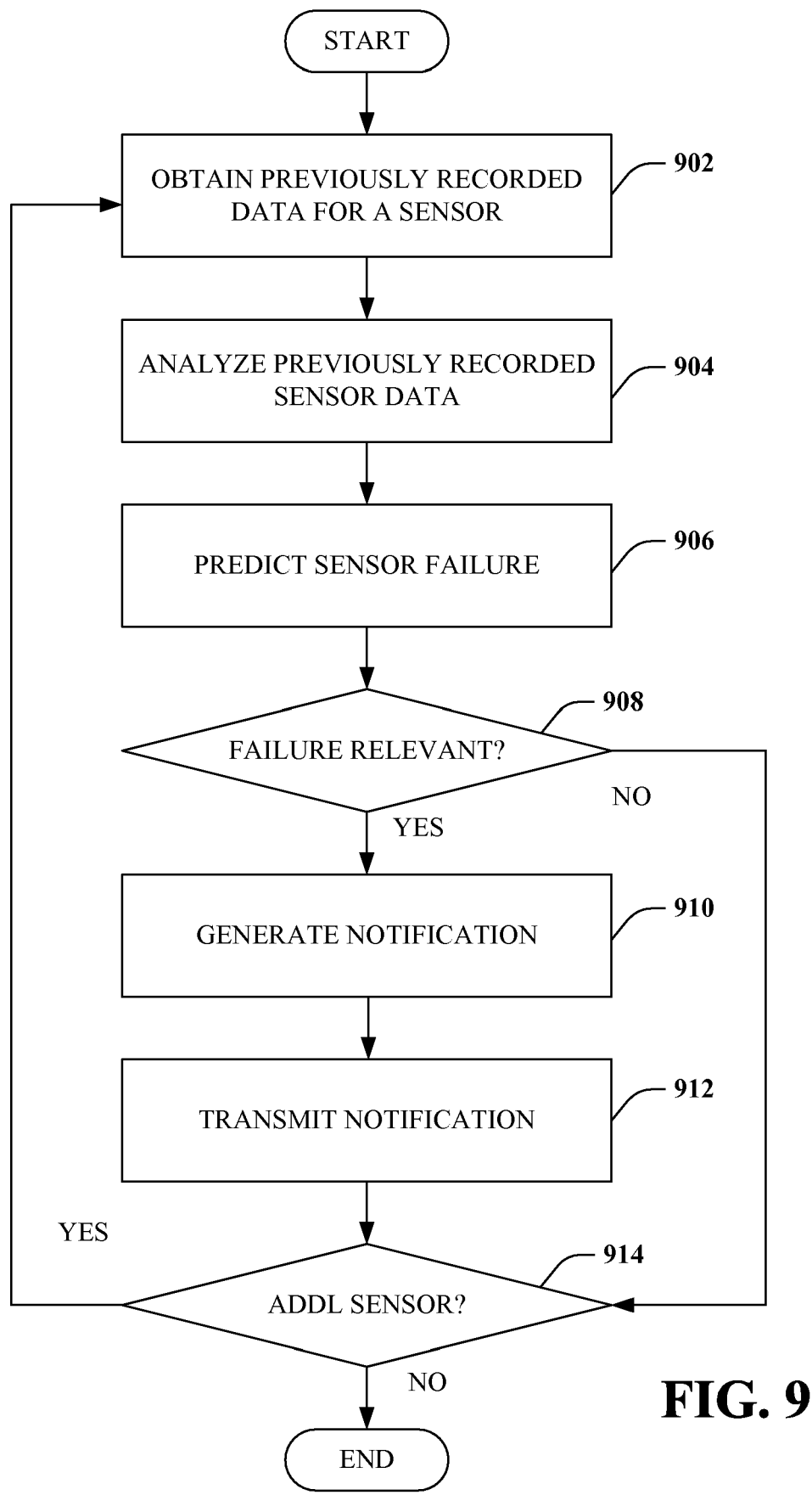
FIG. 9 is a representative flow diagram of a methodology for predicting sensor degradation in accordance with the subject matter described herein.

Referring now to FIGS. 7-9, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring specifically to FIG. 7, a methodology for detecting degradation of sensor data is illustrated. At reference numeral 702, sensor data is received from a plurality of sensors. For example, data can be received from a set of pressure sensors embedded in a road segment. Alternatively, sensor data can be received from sensors coupled with vehicles. For instance, a bus system can includes sensors coupled to each bus to monitor current flow of traffic. Sensor data recorded from multiple sensor types in a variety of formats.

At reference numeral 704, a context associated with the current state of the sensors and/or flow system is analyzed. Current context can include time of day, day of the week, current weather conditions and the like. Context can be deduced from various sources including a calendar, a clock, an event calendar listing sporting or cultural events, weather forecasts and the like.

At reference numeral 706, the sensor data can be evaluated and degraded sensor data can be identified. Sensor performance can be evaluated using a comparison of data received from a first sensor to data received from one or more sensors in close proximity to the sensor being evaluated. If the first sensor varies from proximate sensors, it may indicate that the sensor is unreliable. Sensor data can also be analyzed in light of the context information, such as time of day, day of week, etc. For example, a traffic sensor can be expected to generate data indicative of a significantly higher volume of traffic during the weekday rush hours than at three o'clock in the morning on a weekend.

At reference numeral 708, sensor data is output based at least in part upon the analyzed sensor data. Sensor data generated by faulty sensors can be identified and eliminated prior to use by route planning systems, thereby increasing route planning accuracy. Alternatively, all sensor data can be provided to the route planning system. However, sensor data associated with a suspect sensor can be tagged and a probability of sensor data error can also be included. The analysis of the sensor data can greatly improve the reliability of route planning systems utilizing sensor data.

Referring now to FIG. 8, a methodology for providing notification of sensor degradation is disclosed. At reference numeral 802, sensor data associated with a sensor is selected for evaluation. After selection, the sensor data is analyzed to ascertain whether sensor data is degraded at reference numeral 804. To determine sensor data degradation, sensor data can be analyzed with respect to data received from proximate sensors, expected sensor data and sensor context.

At reference numeral 806, a determination is made as to whether an alert or notification is to be generated for the sensor data. The determination is based upon the analysis of sensor data. For example, the determination can be based upon the probability that sensor performance is degraded. The probability of degradation can be compared to a predetermined threshold and if the probability is higher than the threshold, a system operator can be notified. If no notification is to be sent, the process continues at reference numeral 812. If a notification is to be transmitted, the notification message can be generated at reference numeral 808. The notification can identify one or more sensors generating suspect sensor data and include a probability that the suspect sensor data is invalid. The notification is transmitted to one or more users or system operators at reference numeral 810. At reference numeral 812, a determination is made as to whether there is additional sensor data to be evaluated. If yes, then the process returns to reference numeral 802, where sensor data is selected for evaluation. If there is no additional sensor data to evaluate, the process terminates. Alternatively, all sensor data can be evaluated prior to transmission of a notification. After evaluation of all sensor data, a single notification listing all instances of degraded sensor data can be transmitted.

Turning now to FIG. 9, a methodology for predicting sensor failure is illustrated. At reference numeral 902, previously recorded sensor data is obtained for a selected sensor. The previously recorded data is analyzed at reference numeral 904. Trends in sensor data and in probability of error of the sensor data are analyzed. At reference numeral 906, failure of a sensor is predicted based upon the analyzed data, as well as sensor information including the type of sensor, age of the sensor, conditions under which the sensor operates. Alternatively, the probability of sensor failure within a specified time period is generated.

A determination is made as to whether the predicted failure is relevant at reference numeral 908. Relevancy can be determined based upon the time at which the sensor is predicted to fail or the probability that the sensor will fail within a specified time period. For example, predicted failure of a sensor within a month may be considered relevant, while predicted failure in five years may not be relevant.

If the predicted failure is not relevant, the process continues at reference numeral 914. If predicted failure is relevant, a notification is generated at reference numeral 910. The notification can include predicted failure date or dates and/or a probability of failure. The notification is transmitted to a system operator at reference numeral 912. The system operator can utilize such notifications in planning sensor maintenance and/or replacement as well as for budgeting purposes. A determination is made as to whether there are additional sensors to review at reference numeral 914. If there are additional sensors, the process returns to reference numeral 902, and previously recorded sensor data is obtained for a selected sensor. If there are no additional sensors, the process terminates.

Figure 10:
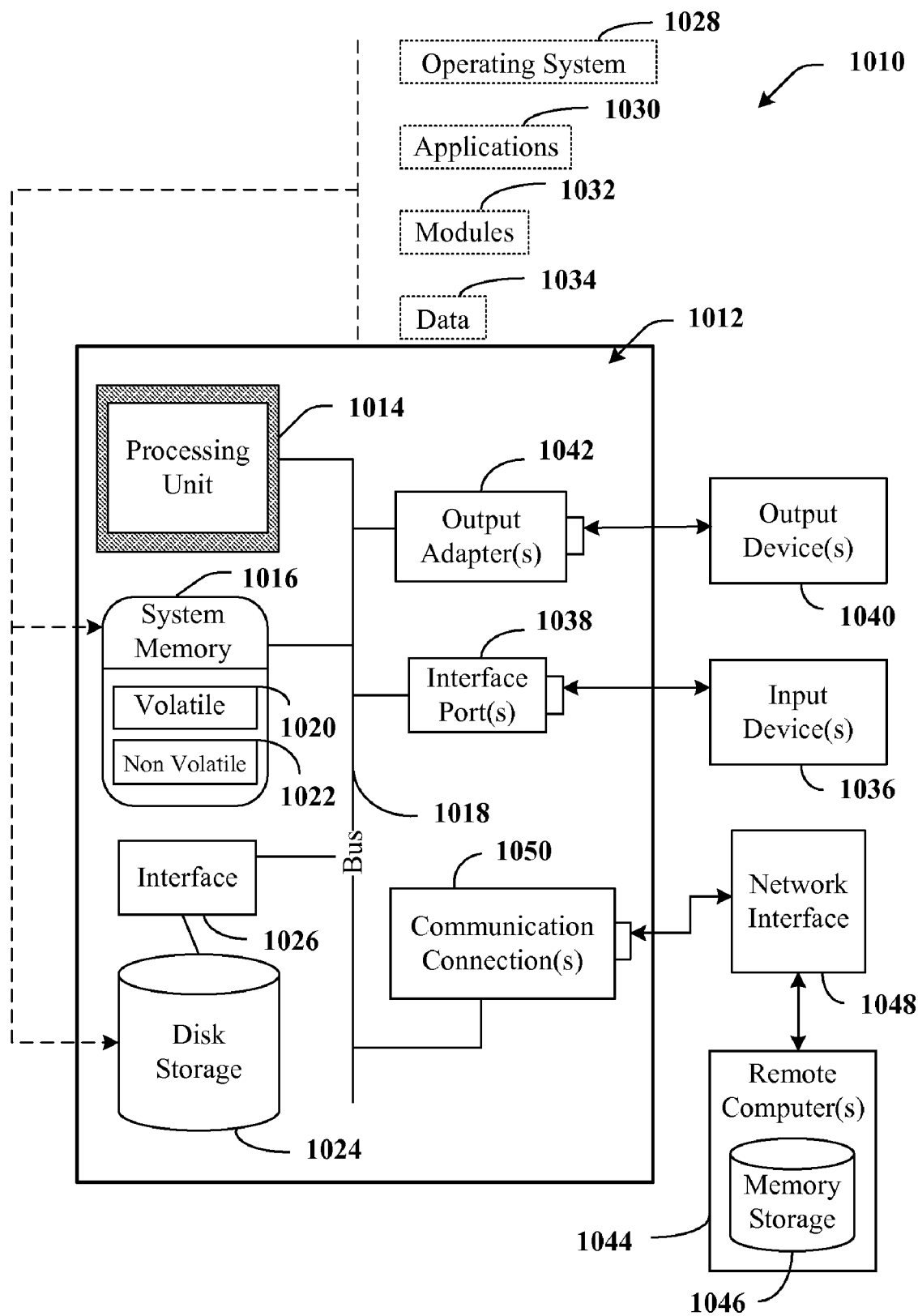
FIG. 10 is a schematic block diagram illustrating a suitable operating environment.

In order to provide additional context for various aspects of the claimed subject matter, FIG. 10 and the following discussion are intended to provide a brief, general description of a suitable operating environment 1010 in which various aspects may be implemented. While the claimed subject matter is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the features described herein. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 that can be employed in connection with creating context-sensitive driving directions includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI). The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). For instance, a DVD-ROM drive can be employed in connection with reading video content from a DVD. To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, touch screen, steering wheel buttons, keyboard, microphone, joystick, game pad, satellite dish, scanner, TV tuner card, digital camera, digital video camera, web camera, remote control, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, in-dash displays, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Wireless Lan (e.g., 802.11 and WiMax) Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
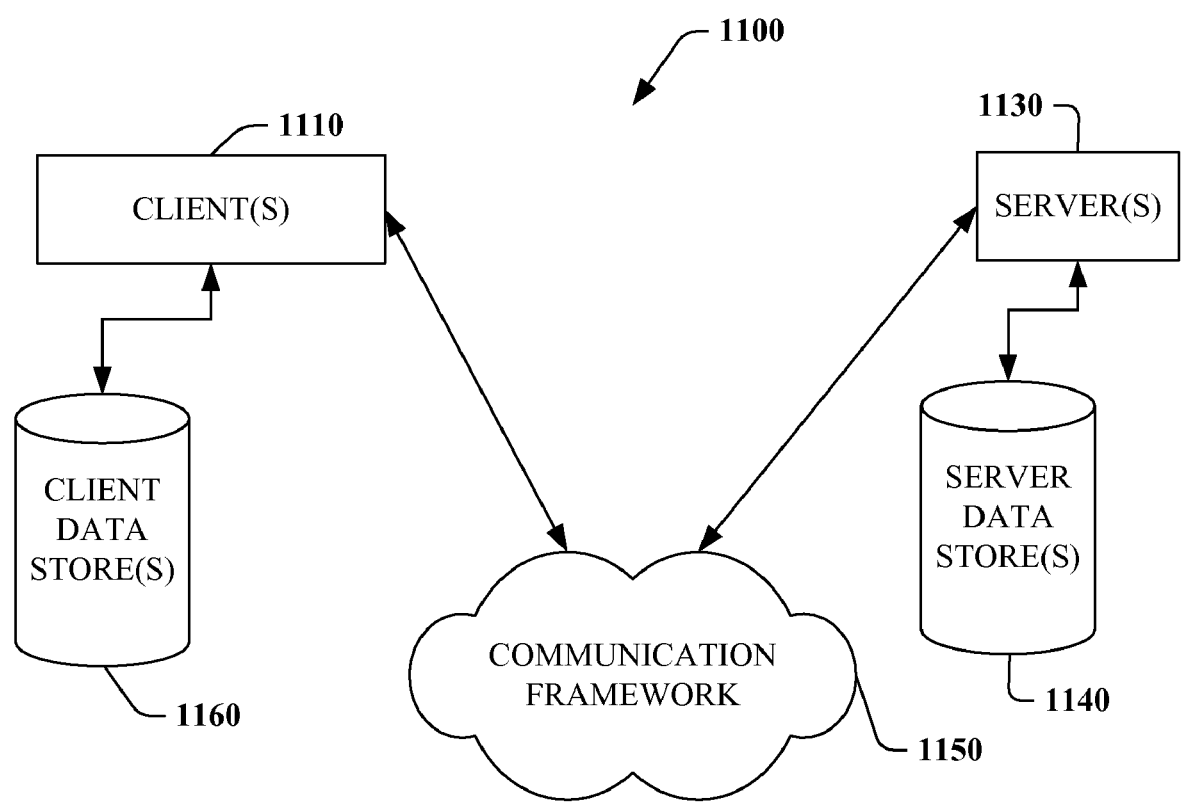
FIG. 11 is a schematic block diagram of a sample-computing environment.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the claimed subject matter, for example. One possible communication between a client 1110 and a server 1130 can be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the server(s) 1130. In one particular example, the server(s) can a sensor monitoring system that is accessible to a client by way of a network. Users can receive information regarding degradation of sensor or sensor data from the sensor monitoring system within the server by way of the client and the network.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for context-sensitive monitoring of sensor performance for an arterial flow system, comprising the following computer-executable components:
   a sensor interface component that obtains sensor data from a plurality of sensors;
   a context analyzer component that analyzes contextual data received from at least one data source, the contextual data being associated with the sensor data;
   a sensor analyzer component that identifies which of the sensor data is degraded based at least in part upon analysis of the contextual data; and
   an output component that provides output sensor data based at least in part upon identification of the degraded sensor data.

2. The system of claim 1, wherein the plurality of sensors is heterogeneous.

3. The system of claim 1, wherein the output sensor data is based at least in part upon the sensor data, filtered to remove the degraded sensor data or to appropriately use the sensor data in accordance with a sensor error model.

4. The system of claim 1, wherein the output sensor data includes a probabilistic function that describes the degradation of the sensor data.

5. The system of claim 1, further comprising a creation component that employs machine learning to build at least one model used to predict and/or interpret output of the plurality of sensors, including error models and/or failure models.

6. The system of claim 1, further comprising:
   a notification component that generates an alert as a function of the degraded sensor data.

7. The system of claim 1, further comprising:

a sensor predictor component that predicts failure of a subset of the plurality of sensors; and a notification component that generates an alert as a function of the predicted failure.

8. The system of claim 1, further comprising a sensor data store that maintains previous sensor data used in analysis of the sensor data.

9. The system of claim 1, wherein the sensor analyzer component identifies degradation in the sensor data based at least in part upon sensor data from a physically proximate sensor.

10. The system of claim 1, wherein the sensor analyzer component utilizes a traffic flow representation during identification of degraded sensor data.

11. A computer-implemented method for identifying questionable sensor data, comprising:

obtaining sensor data from a plurality of sensors;

analyzing context from at least one source with the plurality of sensors;

identifying suspect data based at least in part upon the analyzed context; and providing output sensor data based in part upon the identified suspect data.

12. The method of claim 11, further comprising outputting the identified suspect data and a probability that the identified suspect data is incorrect.

13. The method of claim 11, wherein the plurality of sensors comprise a collection of heterogeneous sensors.

14. The method of claim 11, further comprising:

predicting a failure of at least one of the plurality of sensors as a function of the identified suspect data; and generating a notification as a function of the predicted failure of the at least one of the plurality of sensors.

15. The method of claim 11, further comprising:

predicting a probability of failure of at least one of the plurality of sensors within a specified time period; and generating a notification based upon the probability.

16. The method of claim 11, wherein the context comprises at least one of day of week, time of day, and/or weather conditions.

17. The method of claim 11, wherein the context of a first data source comprises data obtained from a physically proximate data source.

18. A system for context-sensitive monitoring of sensor performance for an arterial flow system comprising the following computer-executable components:

means for receiving sensor data from a plurality of sensors;

means for analyzing the sensor data based at least in part upon context received from at least one data source, the context being associated with the sensor data; and means for filtering output data based at least in part upon the sensor data analysis.

19. The system of claim 18, wherein the sensor data analysis utilizes a traffic flow representation.

20. The system claim 18, further comprising:

means for predicting a failure of a subset of the plurality of sensors; and means for notifying a user of the predicted sensor failure.

* * * * *